United States Patent [19]
Lienert et al.

[11] Patent Number: 5,084,304
[45] Date of Patent: Jan. 28, 1992

[54] PROCESS FOR COATING METAL STRIP BY THE COIL COATING PROCESS FOR THE PRODUCTION OF COMPONENTS EXPOSED TO HIGH TEMPERATURES

[75] Inventors: Klaus-Wilhelm Lienert, Hamburg; Arno Schmitz, Nottuln, both of Fed. Rep. of Germany

[73] Assignee: BASF Lacke & Farben AG, Münster-Hiltrup, Fed. Rep. of Germany

[21] Appl. No.: 490,641

[22] Filed: Jun. 13, 1990

[30] Foreign Application Priority Data

Nov. 23, 1987 [DE] Fed. Rep. of Germany ....... 3739612

[51] Int. Cl.$^5$ .............................................. B05D 3/02
[52] U.S. Cl. .................. 427/388.2; 427/409; 524/538
[58] Field of Search ............... 427/388.1, 388.2, 409; 524/538

[56] References Cited

U.S. PATENT DOCUMENTS

| | | | |
|---|---|---|---|
| 3,207,728 | 9/1965 | Blomstrom | 260/78 |
| 3,234,181 | 2/1966 | Oliver | 260/47 |
| 3,397,253 | 8/1968 | Merten et al. | 260/830 |
| 3,554,984 | 1/1971 | George | 260/78 |
| 4,103,050 | 7/1978 | Laskin et al. | 427/388.2 X |
| 4,140,819 | 2/1979 | Tobius et al. | 427/388.2 |
| 4,329,397 | 5/1982 | Zamek et al. | 428/379 |

FOREIGN PATENT DOCUMENTS 0133519  2/1985  European Pat. Off.
2311831 12/1976  France.

Primary Examiner—Michael Lusignan
Attorney, Agent, or Firm—Kenyon & Kenyon

[57] ABSTRACT

The invention relates to a process for coating metal strip by the coil coating process using coating materials consisting of high temperature resistant systems (polyesterimides, polyamidocarboxylic acids, polyamidimides, polyhydantoins and polybismaleimides), pigments and/or fillers, suitable auxiliary substances and additives as well as solvents or solvent mixtures. The coating material is used in a one-coat or two-coat application, only polyesterimides and polyhydantoins being used for the primers as high temperatures resistant systems, while any of the high temperature resistant systems listed are used in the topcoat.

The metal strip coated in this manner possesses good formability, good hardness, outstanding anticorrosion characteristics, outstanding resistance to chemicals, solvents, water, oil, shock and prolonged high temperatures, outstanding adhesion and resistance to stone impact, and is particularly suitable for the production of exhausts, silencers, exhaust air ducts, furnace and radiator claddings, grill utensils and other components exposed to high temperatures.

23 Claims, No Drawings

PROCESS FOR COATING METAL STRIP BY THE COIL COATING PROCESS FOR THE PRODUCTION OF COMPONENTS EXPOSED TO HIGH TEMPERATURES

The invention relates to a process for coating metal strip by the coil coating process using high temperature resistant systems.

Suitable binders for the coil coating process are, for example, polyester resins containing hydroxyl groups, capable of being cured with aminoplast resins.

High temperature resistant systems, such as, for example, silicone resins, polyesterimide resins, polyimide resins, polyamidimide resins, polyhydantoins, polybismaleimides, polyether sulfones and others are known. Depending on their chemical composition, these binders are employed as coating material for electronic components, coils, electrical conductors, structural components exposed to high temperatures such as exhaust fans, pipes, district heating installations etc. Coating using these coating materials is carried out by various techniques such as, for example, spraying, injection molding, dipping, brushing etc. The shortcomings of these application techniques are high solvent emission and/or the need for long baking times.

High temperature resistant paints based on silicone resins are known from EP-A-176,251. However, these paints are rather unsuitable for painting motor car exhausts. In the painting of exhausts, it is not only a question of high temperature resistance, but also a question of shock and water resistance as well as resistance toward salt and the corrosive exhaust gases. Moreover, the coating of exhausts by conventional techniques using silicone resins is expensive and the baking times are long.

The object forming the basis of the invention is to develop a process for coating metal strip by the coil coating process which is particularly suitable for coating components exposed to high temperatures, such as exhausts, silencers etc. The resultant coatings should therefore possess good temperature resistance, good shock and water resistance as well as good resistance to salt, gasoline, oil and the corrosive exhaust gases. The important criteria are in particular good long-term temperature resistance and outstanding corrosion protection. In addition, the resultant coatings must exhibit good substrate and intercoat adhesion as well as good mechanical fabrication properties, and the required baking times should be as short as possible.

The object forming the basis of the invention is achieved by the process of the type outlined at the outset, wherein I. the coating materials comprise
  A) a high temperature resistant system consisting either of
    a) 3 to 50% by weight, preferably 20 to 40% by weight, of polyesterimide resin, in which 20 to 60% by weight solutions of the polyesterimides possess viscosities in the range from 90 to 4000 mPas at 23° C. and the hydroxyl numbers of the polyesterimides are in the range from 50 to 200 mg of KOH/g, or of
    b) 3 to 50% by weight, preferably 8 to 30% by weight, of polyhydantoins, in which 20 to 40% by weight solutions of the polyhydantoins possess viscosities in the range from 1000 to 3000 mPas at 23° C., or of
    c) 3 to 40% by weight, preferably 5 to 20% by weight, of polyamidocarboxylic acids, in which 10 to 30% by weight solutions of the polyamidocarboxylic acids possess viscosities in the range from 2000 to 7000 mPas at 23° C. and in which the polyamidocarboxylic acids form imide rings by cyclization, or of
    d) 3 to 50% by weight, preferably 15 to 35% by weight, of polyamidimides, in which 20 to 40% by weight solutions of the polyamidimides possess viscosities in the range from 800 to 3000 mPas at 23° C., or of
    e) 3 to 50% by weight, preferably 8 to 35% by weight, of polybismaleimides, in which 20 to 40% by weight solutions of the polybismaleimides possess viscosities in the range from 200 to 4000 mPas at 23° C.,
  B) 3 to 40% by weight, preferably 10 to 30% by weight, of pigments and/or fillers,
  C) up to 3% by weight of auxiliary substances and additives suitable for the application,
  D) 10 to 90% by weight, preferably 20 to 70% by weight, of one or more organic solvents,
  E) if polybismaleimides are used, up to 45% by weight—based on the polybismaleimide—of an olefinically unsaturated monomer and, optionally, a free-radical initiator, the total of all the components A) to E) being 100% by weight,
II. in a two-coat application of the coating materials the primer contains only polyesterimides Aa) or polyhydantoins Ab) as the high temperature resistant system A) and the topcoat contains one of the components Aa) to Ae) as the high temperature resistant system A), except for coating materials in which both the primer and the topcoat contain polyesterimides as the component A),
III. in a one-coat application of the coating materials no polyesterimides are used as the component A), and
IV. the curing of the metal strip is carried out in the presence of suitable catalysts at object temperatures of 200° to 350° C. over a period from 30 to 120 seconds.

The polyesterimide resins used as the component Aa) are known and are described, for example, in DE-OS 1,445,263 and DE-OS 1,495,100. The preparation of the polyesterimides is carried out in a known manner by esterifying the polybasic carboxylic acids with the polyhydric alcohols, if desired in the presence of hydroxycarboxylic acids, and by using starting materials containing imide groups. In place of the free acids and/or alcohols it is also possible to use their reactive derivatives. Terephthalic acid is preferably used as the carboxylic acid component, and ethylene glycol, glycerol and tris-2-hydroxyethyl isocyanurate are preferably used as the polyhydric alcohols, the last-named compound being particularly preferred. When tris-2-hydroxyethyl isocyanurate is used, the softening temperature of the resultant paint film is raised.

The starting materials containing imide groups may be prepared, for example, by reacting compounds of which one must possess a five-membered cyclic carboxylic anhydride group and at least one further functional group, while the other contains besides one primary amino group at least one further functional group. These further functional groups are in particular carboxyl groups or hydroxyl groups, but they may also be further primary amino groups or carboxylic anhydride groups.

Examples of compounds having one cyclic carboxylic anhydride group with one further functional group are in particular pyromellitic anhydride and trimellitic anhydride. However, other aromatic carboxylic anhydrides are also suitable, for example naphthalenetetracarboxylic dianhydride or dianhydrides of tetracarboxylic acids having two benzene nuclei in the molecule in which the carboxyl groups are in the 3,3',4 and 4' position.

Examples of compounds having one primary amino group and one further functional group are in particular diprimary diamines, for example ethylenediamine, tetramethylenediamine, hexamethylenediamine, nonamethylenediamine and other aliphatic diprimary diamines. Other suitable compounds are aromatic diprimary diamines, such as benzidine, diaminodiphenylmethane, diaminodiphenyl ketone, diaminodiphenyl sulfone, diaminodiphenyl sulfoxide, diaminodiphenyl ether and diaminodiphenyl thioether, phenylenediamines, toluylenediamines, xylylenediamines as well as diamines having three benzene nuclei in the molecule, such as bis(4-aminophenyl)-α,α'-p-xylene or bis(4-aminophenoxy)-1,4-benzene, and finally cycloaliphatic diamines, such as 4,4'-dicyclohexylmethanediamine. In addition, aminoalcohols, for example monoethanolamine or monopropanolamine, may be used as compounds containing amino groups with one further functional group, as well as aminocarboxylic acids such as glycine, aminopropionic acids, aminocaproic acids or aminobenzoic acids.

Known transesterification catalysts are used for the preparation of the polyesterimide resins, for example heavy metal salts such as lead acetate, zinc acetate, as well as organic titanates, cerium compounds and organic acids, such as, for example, p-toluenesulfonic acid. The same transesterification catalysts may be used as cross-linking catalysts in the curing of the polyesterimides—expediently in amounts up to 3% by weight, based on the binder.

Polyhydantoins (component Ab)) are known and are described, for example, in DE-OS 3,144,701, DE-OS 3,347,659, DE-OS 2,854,442, DE-PS 1,720,624, DE-OS 3,003,773 and in Angew. Chemie 83, pages 339-347 (1971).

A number of possibilities are available for the synthesis of polyhydantoins. The most important methods are the preparation from N,N'-bis(alkoxycarbonylmethyl)-diamines or from compounds substituted by N-alkoxycarbonylmethyl which possess at least one group capable of reacting with isocyanates, and polyisocyanates, and the preparation from polycarbodiimides with derivatives of α,β-unsaturated carboxylic acids.

Accordingly, the polyhydantoins may be prepared, for example, by reacting polyisocyanates with polyfunctional, preferably difunctional α-aminocarboxylic acid derivatives of the general formula (I):

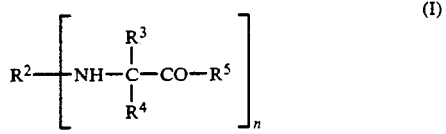

in which $R^2$ represents an alkyl radical of 2 to 20 carbon atoms which is unsubstituted or substituted by halogen, alkyl groups of 1 to 10 carbon atoms and/or aryl groups of 6 to 12 carbon atoms, an aryl radical of 5 to 12 carbon atoms, a cycloalkyl radical of 5 to 12 carbon atoms, an alkyl/aryl radical of 6 to 20 carbon atoms and an aryl or cycloalkyl radical of 5 to 12 carbon atoms containing a hetero atom such as N, O or S in the ring, $R^3$ and $R^4$ denote hydrogen, an alkyl radical of 1 to 20 carbon atoms, an aryl radical of 5 to 12 carbon atoms or an aralkyl radical of 6 to 20 carbon atoms, $R^5$ denotes a hydroxyl group, an amino group, a $C_1$ to $C_{20}$ alkylamino group, a $C_1$ to $C_{20}$ dialkylamino group, a $C_1$ to $C_{20}$ alkoxy group or a $C_5$ to $C_{12}$ aroxy group, and n denotes an integer from 2 to 4, preferably 2. They are known from U.S. Pat. No. 3,397,253.

Those aromatic radicals are particularly preferred for $R^2$ which are derived from benzene, azobenzene, naphthalene, anthracene, biphenyl, triphenylmethane, diphenylmethane and diphenyl ether. These radicals may be mono- or polysubstituted, for example by $C_1$ to $C_{20}$ alkyl (methyl) groups, halogen (chlorine) groups, nitro groups, $C_1$ to $C_{20}$ alkoxy (methoxy) groups, $C_1$ to $C_{20}$ dialkylamino (dimethylamino) groups, acyl (acetyl) groups, $C_2$ to $C_{17}$ carbalkoxy (carbomethoxy or carboethoxy) groups and cyano groups. Radicals, in particular those derived from benzene, naphthalene, diphenylmethane or diphenyl ether, which are optionally mono- or disubstituted by methyl and/or chlorine or are mono- or disubstituted by carboxyl groups are preferred.

The radicals $R^3$ and $R^4$ may be attached to one another as members of a cyclic $C_2$ to $C_{20}$ alkyl radical, and they may be substituted by halogen (chlorine, bromine), cyano, hydroxycarbonyl, aminocarbonyl, alkoxycarbonyl or aroxycarbonyl.

The preparation of the α-aminocarboxylic acid derivatives is known and may be carried out, for example, by reacting aromatic amines or aminocarboxylic acids with haloacetic acid or derivatives thereof in the presence of bases such as, for example, CaCa3 (sic) or also by condensing the aromatic amines or aminocarboxylic acids with hydrogen cyanide and aldehydes or ketones, followed by conversion of the nitrile group to, for example, carboxylic acid, ester or amide.

Furthermore, it is also possible to react polyamines with 1,2-alkylenedicarboxylic acid esters to form aspartic acid esters which then likewise react with polyisocyanates and cyclize to form polyhydantoins (compare, for example, DE-PS 1,720,624).

Aliphatic, cycloaliphatic, araliphatic, aromatic and heterocyclic polyisocyanates may be used as the isocyanate component. Suitable examples are found, for example, in DE-OS 2,854,442 as well as in the description of the polyamidimides used as the component Ad) of this Application.

In the reaction between the isocyanate and the N-alkoxycarbonylmethyl component it is essential that the addition is carried out in as quantitative a manner as possible before the cyclization of the urea intermediate occurs, since otherwise the alcohol liberated in the cyclization reacts with the isocyanate in its own right. The catalyst and the reaction medium have a decisive influence on the course of the reaction. One possibility is to carry out the reaction in phenol or cresol, since these solvents are effective as catalysts for the addition reaction of the isocyanates onto the N-alkoxycarbonylmethyl component and, moreover, since the polymers are readily soluble in these media.

However, as described in DE-OS 2,854,442, it is also possible to carry out the reaction in solvents free from phenols, if the reaction of the α-aminocarboxylic acid derivatives with the isocyante is carried out in the presence of acidic groups, preferably carboxyl groups, at temperatures from −10° to 500° C., preferably from 20 to 400° C. Particularly valuable hydantoin compounds are obtained if the compound containing the carboxyl groups is at least bifunctional, i.e. contains besides the carboxyl group one further functional group such as, for example, a carboxyl group, a carboxylic acid ester group, a cyclic anhydride group, a hydroxyl group, an amino group or a glycine derivative group. Polycarboxylic acids are preferably used, dicarboxylic acids being particularly preferred. Examples of suitable acidic compounds and more details of the process are found in DE-OS 2,854,442.

In addition, the polyhydantoins may be obtained by reacting a carbodiimide with the derivative of an $\alpha,\beta$-unsaturated carboxylic acid of the formula (II)

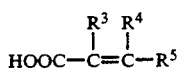

(II)

in which
$R^3$ and $R^4$ denote hydrogen or lower alkyl, $R^5$ denotes a CN group, a CHO group or a $-COR^6$ group in which $R^6$ denotes alkyl, aryl, alkoxy, arylalkoxy or dialkylamino.

Monocarbodiimides having an —N=C=N— group in the molecule, their cyclic dimers or trimers or linear or branched polycarbodiimides having more than 2 carbodiimide groups in the molecule, may be used as the carbodiimide compounds.

Compounds used as the monocarbodiimides are N,N'-symmetrically and/or asymmetrically substituted aliphatic, aliphatic-aromatic, cyclic, heterocyclic or aromatic compounds optionally substituted by hetero atoms, having an —N=C=N— group in the molecule, for example dialkylcarbodiimides such as dimethylcarbodiimide, diethylcarbodiimide, diisopropylcarbodiimide, dihexylcarbodiimide, dibutylcarbodiimide, dinonylcarbodiimide, didodecylcarbodiimide and distearylcarbodiimide, preferably aromatic, optionally substituted monocarbodiimides such as diphenylcarbodiimide, ditolylcarbodiimide, dinaphthylcarbodiimide, di(p-iodophenyl)carbodiimide, di(p-dimethylaminophenyl)carbodiimide, di(pyridyl)carbodiimide, dinitrophenylcarbodiimide, dialkoxyphenylcarbodiimide, diaroxyph-enylcarbodiimide, dichlorophenylcarbodiimide, bis-dichlorophenylcarbodiimide, bis-trichlorophenylcarbodiimide, bis-tetrachlorophenylcarbodiimide, bispentachlorophenylcarbodiimide, dibenzylphenylcarbodiimide, di-p-bromophenylcarbodiimide, or carbodiimide dibenzoic acid ester, carbodiimide diphthalic acid ester, carbodiimide diisophthalic acid ester, carbodiimidedibenzonitrile, cycloaliphatic carbodiimides such as dicyclohexylcarbodiimide and unsaturated carbodiimides such as diallylcarbodiimide, dioleylcarbodiimide and dicyclohexenylcarbodiimide.

In addition, the N-sulfonylcarbodiimides $RSO_2N=C=NR$, the N-aminocarbodiimides $RN=C=NR_2$ or the N,N'-disilylcarbodiimides, such as those listed, for example, in Chem. Rev. 67,2 (1967), p. 107, may be used.

Compounds which may also be used as starting components comprise aliphatic, cycloaliphatic, araliphatic, aromatic and heterocyclic linear and branched polycarbodiimides having more than two carbodiimide groups and their mixtures, or polycarbodiimides which possess in the polymer molecule a random composition or a block-like structure produced from various structural elements in a certain length of sequence and thus are able to contain the aliphatic, cycloaliphatic, araliphatic, aromatic and heterocyclic structural units listed above in the polymer molecule in the most diverse proportions both randomly distributed and arranged in blocks.

Particularly preferred are mixtures consisting of polytoluylenecarbodiimides (2,4- and 2,6-substitution products), poly-m-phenylenecarbodiimides as well as polycarbodiimides based on aniline-formaldehyde condensation products with a polyphenylenemethylene structure, and poly-4,4'-diphenylethercarbodiimides, poly-p-phenylenecarbodiimides, poly-1,5-naphthylenecarbodiimides, polyisophoronecarbodiimides and polyhexamethylenecarbodiimides and/or their mixtures as well as block polycarbodiimides, for example of the following structures:

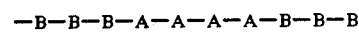

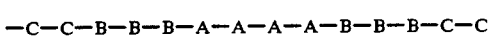

in which A is, for example, an aromatic structural element such as diphenylmethane, B represents an aliphatic radical R such as, for example, the isophorone radical and C represents an aromatic unit such as, for example, the toluylene or naphthylene group. The preparation of the carbodiimides is described, for example, in DE-OS 3,347,659 and DE-OS 3,144,701.

Examples of suitable $\alpha,\beta$-unsaturated carboxylic acid derivatives of the formula (II) given above, are the following:

Fumaronitrile and maleinitrile, the hemiamides of fumaric and maleic acid, the N-dimethyl, N-diethyl and N-methylethyl hemiamides of maleic and fumaric acid being particularly preferred, the monoesters of maleic and fumaric acid, such as, for example, the monomethyl ester of fumaric and maleic acid, the monoethyl ester of fumaric and maleic acid etc., which may be obtained, for example, by reacting maleic and fumaric acid or maleic anhydride with the corresponding alcohols or hydroxyethers such as butanol, isopropanol, hexanol, cyclohexanol, benzyl alcohol, ethylene glycol or ethylene glycol monomethyl ether etc. to give the monoesters, $\beta$-benzoylacrylic acid and its derivatives which may be obtained, for example, by a Friedel-Crafts acylation, and $\beta$-formylacrylic acid. Other examples will be found, for example, in DE-OS 3,347,659.

Mixtures or partially converted mixtures of $\alpha,\beta$-unsaturated cyclic dicarboxylic anhydrides and hydroxy compounds, preferably aromatic hydroxy compounds, may be used in place of the derivatives of $\alpha,\beta$-unsaturated carboxylic acids (cf., for example, DE-OS 3,347,659).

At least one equivalent of the $\alpha,\beta$-unsaturated carboxylic acid derivative is generally used per equivalent of carbodiimide. However, very wide deviations from these proportions are possible.

The reaction of the carbodiimides with the derivatives of the $\alpha,\beta$-unsaturated carboxylic acids may be carried out in a homogeneous phase, as a heterogeneous reaction in suspension, in the absence of a solvent or using an excess of one of the reactants in reaction times ranging from a few minutes to several hours at temperatures from 20° to about 250° C., preferably 30° to 200° C. Solvents which are non-reactive under the reaction conditions used or which optionally form loose addition compounds which react further, are suitable reaction media. Such solvents are, for example, aliphatic, aromatic or heterocyclic unsubstituted or substituted hydrocarbons, such as, for example, methylene chloride, γ-butyrolactone, toluene, xylene, phenol, cresol and others. Mixtures consisting of a low-boiling and a higher-boiling liquid, such as, for example, methylene chloride/chlorobenzene, are often used. Phenolic solvents/solvent mixtures are preferably used, since they also dissolve the resultant polyhydantoins.

If desired, the reaction may be carried out in the presence of catalysts, for example of catalysts which accelerate the addition of compounds containing an OH function to the carbodiimide groups, or of bases. Catalysts which are used for the formation of the carbodiimides, for example phospholine oxide, are particularly suitable. In the majority of cases, however, no catalyst is required The reaction is expediently carried out in an inert gas atmosphere, such as nitrogen or argon.

As described in DE-OS 3,003,773, polyhydantoins may also be prepared by reacting at a temperature from 0° to 450° C., preferably from 30° to 250° C., organic diisocyanates with unsubstituted or substituted fumaric monoesters of the general formula (III)

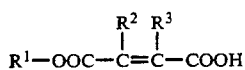

(III)

in which $R^1$, $R^2$ and $R^3$, which may be the same or different, denote an aliphatic radical of 1 to 22 carbon atoms, preferably 1 to 17 carbon atoms, an aliphatic aromatic radical of 7 to 20 carbon atoms, preferably 7 to 15 carbon atoms, or an aromatic radical of 5 to 16 carbon atoms, preferably 6 to 13 carbon atoms, or a heterocyclic radical of 3 to 10 carbon atoms in the ring and 1 to 3 hetero atoms, such as N, S and/or O in the ring, in addition $R^2$ and $R^3$ also denote H and halogen, preferably F and Cl.

Solutions of the polyhydantoins possess, at 20 to 40% by weight of solids and at 23° C., viscosities of from 1000 to 3000 mPas.

The polyamidocarboxylic acids used as the component Ac) are known and are described, for example, in GB 898,651, US 3,207,728 and US 3,234,181. The preparation of the polyamidocarboxylic acids is carried out in a known manner (cf., for example, GB-PS 898,651) by reacting primary diamines, triamines or tetramines with anhydrides of tetracarboxylic acids in suitable solvents.

Examples of suitable primary diamines are aliphatic diprimary diamines such as, for example, ethylenediamine, tetramethylenediamine, 1,2-bis(3-aminopropoxy)ethane, 2,2-dimethylprop-vlenediamine, hexamethylenediamine, heptamethylenediamine, octamethylenediamine, nonamethylenediamine, decamethylenediamine, dodecamethylenediamine, 3-methylheptamethylenediamine, 4,4-dimethylheptamethylenediamine, 2,11-diaminododecane, 3-methoxyhexamethylenediamine, 2,2-dimethylpropylenediamine, 2,5-dimethylhexamethylenediamine, 2,5-dimethylheptamethylenediamine, 5-methylnonamethvlenediamine, 2,17-diaminoeicosadecane, 1,10-diamino-1,10-dimethyldecane, 1,12-diaminooctadecane; cycloaliphatic diprimary diamines such as, for example, 4,4,'-diaminodicyclohexylmethane, 1,4-diaminocyclohexane; diprimary aromatic diamines such as, for example, benzidine, 4,4,'-diaminodiphenylmethane, 4,4,'- and 3,3,'-diaminodiphenylpropane, 4,4,'- and 3,3'-diaminodiphenyl ketone, oxide, sulfone, sulfide, sulfoxide, ether and thioether, phenylenediamines, toluylenediamines, xylylenediamines, 1,5-diaminonaphthalene, 3,3'-dimethoxybenzidine, 3,3'-dimethyl-4,4,'-diphenyldiamine, 2,4-bis(beta-amino-t-butyl)toluene, bis(parabeta-amino-t-butylphenyl) ether, bis(para-beta-methyldelta-aminopentyl)benzene, 1-isopropyl-2,4-metaphenylenediamine, bis-para(1,1-dimethyl-5-aminopentyl)benzene, 2,6-diaminopyridine and bis(4-aminophenyl)methylphosphine oxide as well as diamines having three benzene nuclei in the molecule, such as bis(4-aminophenyl)-α,α'-p-xylene, bis(4-aminophenoxy)-1,4-benzene or bis(4-aminophenyl)phenylphosphine oxide.

The primary triamines and tetramines are preferably compounds in which the $NH_2$ groups are attached to a benzene, naphthalene, pyridine or a triazine ring. They may also be attached to a plurality of benzene rings which are bonded together, inter alia, by various alkyl, aryl, ether, sulfone, sulfide and phosphate groups. Examples of such amines are the following: 1,2,4-triaminobenzene, 1,2,3-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminobiphenyl, 2,4,6-triaminopyridine, 2,4,4'-triaminophenyl ether, 2,4,4'-triaminodiphenylmethane, 2,4,4'-triaminodiphenylsulfone, 2,4,4'-triaminobenzophenone, 2,4,4'-triamino-3-methyldiphenylmethane, N,N,N-tri(4-aminophenyl)amine, tri(4-aminophenyl)methane, phenyl-4,4',4"-triaminoorthophosphate, tri(4-aminophenyl)phosphine oxide, 3,5,4'-triaminobenzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3',4,4'-tetraaminophenyl ether, 3,3',4,4'-tetraaminodiphenylmethane, 3,3',4,4'-tetraaminodiphenyl sulfone, 3,5-bis(3,4'-diaminophenyl)pyridine.

The carboxylic anhydrides which are suitable for the preparation of the polyamidocarboxylic acids are, for example, pyromellitic dianhydride, naphthalenetetraacetic dianhydrides, dianhydrides of tetracarboxylic acids having 2 benzene nuclei in the molecule, in which the carboxyl groups are in the 3,3',4,4'-position, such as, for example, 3,3',4,4'-diphenyltetracarboxylic dianhydride, bis(3,4-dicarboxyphenyl)ether dianhydride, 2,2-bis(3,4-dicarboxyphenyl)propane dianhydride as well as thiophenetetracarboxylic anhydride.

Suitable solvents for the preparation of the polyamidocarboxylic acids are those organic compounds whose functional groups react only to a small extent with the amine and anhydride groups of the starting materials and which dissolve either the amine or the anhydride, but preferably both starting compounds, as well as the resultant amidocarboxylic acid. Examples are N,N-dimethylformamide, N,N-dimethylacetamide, N,N-diethylformamide, N,N-diethylacetamide, N,N-dimethylmethoxyacetamide, N-methylcaprolactam, dimethyl sulfoxide, N-methylpyrrolidone, tetramethylurea, pyridine, formamide, N-methylformamide, N-acetylpyrrolidone, dimethyl sulfone, tetramethylene sulfone and hexamethylphosphoramide. 10 to 30% solutions of the polyamidocarboxylic acid produced possess viscosities of 2000 to 7000 mPas at 23° C.

The polyamidocarboxylic acids may be converted thermally by cyclization, in the presence or absence of a dehydrating agent, into the polyimides.

The polyamidimides used as the component Ad) are likewise known and are described, for example, in U.S. Pat. No. 3,554,984, DE-OS 2,441,020, DE-OS 2,556,523, DE-AS 1,266,427 and DE-OS 1,956,512. The preparation of the polyamidimides is carried out in a known manner from the polycarboxylic acids or their anhydrides, in which 2 carboxylic groups are adjacent to each other and which must contain at least one further functional group, and from polyamines having at least one primary amino group capable of forming the imide ring, or from compounds having at least 2 isocyanate groups. The polyamidimides may also be obtained by reacting polyamides, polyisocyanates containing at least 2 NCO groups, and cyclic dicarboxylic anhydrides containing at least one further group capable of condensation or addition.

It is also possible to prepare the polyamidimides from diisocyanates or diamines and dicarboxylic acids, provided that one of the components already contains the imide group. Thus a tricarboxylic anhydride may first be reacted with a diprimary diamine to form the corresponding diimidocarboxylic acid which then reacts with a diisocyanate to form the polyamidimide.

Tricarboxylic acids or their anhydrides in which 2 carboxyl groups are in an adjacent position to one another, are preferred for the preparation of the polyamidimides. The corresponding aromatic tricarboxylic anhydrides, such as, for example, trimellitic anhydride, naphthalenetricarboxylic anhydrides, bisphenyltricarboxylic anhydrides as well as further tricarboxylic acids having 2 benzene nuclei in the molecule and 2 adjacent carboxyl groups, such as those listed in the examples of DE-OS 1,956,512, are preferred. Trimellitic anhydride is particularly preferred. The diprimary diamines already described under the polyamidocarboxylic acids may be used as the amine components. Aromatic diamines which contain a thiadiazole ring, such as, for example, 2,5-bis(4-aminophenyl)-1,3,4-thiadiazole, 2,5-bis(3-aminophenyl)-1,3,4-thiadiazole, 2-(4-aminophenyl)-5-(3-aminophenyl)-1,3,4-thiadiazole as well as the mixtures of the various isomers, may also be used.

Suitable diisocyanates for the preparation of the polyamidimides are aliphatic diisocyanates such as, for example, tetramethylene, hexamethylene, heptamethylene and trimethylhexamethylene diisocyanate; cycloaliphatic diisocyanates such as, for example, isophorone diisocyanate, $\omega,\omega'$-diisocyanato-1,4-dimethylcyclohexane, cyclohexane 1,3-diisocyanate, cyclohexane 1,4-diisocyanate, 1-methylcyclohexane 2,4-diisocyanate and dicyclohexylmethane 4,4'-diisocyanate; aromatic diisocyanates such as, for example, phenylene, toluylene, naphthalene and xylylene diisocyanates, as well as substituted aromatic systems such as, for example, diphenyl ether diisocyanate, diphenyl sulfide diisocyanate, diphenyl sulfone diisocyanate and diphenylmethane diisocyanate; mixed aromatic-aliphatic and aromatic-hydroaromatic diisocyanates such as, for example, 4-phenylisocyanate methylisocyanate, tetrahydronaphthylene 1,5-diisocyanate, hexahydrobenzidine 4,4'-diisocyanate and hexahydrodiphenylmethane 4,4'-diisocyanate. 4,4'-Diphenylmethane diisocyanate, 2,4-toluylene diisocyanate, 2,6-toluylene diisocyanate as well as hexamethylene diisocyanate are preferably used.

Those polyamides which are obtained by polycondensation of dicarboxylic acids or their derivatives with diamines or of aminocarboxylic acids and their derivatives, such as, for example, lactams, are suitable as the polyamides.

Examples of suitable polyamides are: dimethylenesuccinamide, pentamethylenepimelic acid amide, undecanemethylenetridecanedicarboxamide, hexamethylene adipic acid amide, hexamethylene sebacic acid amide and polycaproic acid amide. Hexamethylene adipic acid amide and polycaproic acid amide are particularly preferred.

As is the case with the polyamidocarboxylic acids, suitable solvents are those organic compounds whose functional groups do not react to a great extent with the starting materials and which dissolve at least one component, preferably also the starting materials as well as the polyamidimide. Examples of these are listed under the description of the polyamidocarboxylic acids. For the curing of the polyamidimides, soluble heavy metal salts such as, for example, zinc octoate, cadmium octoate, tetraisopropyl titanate or tetrabutyl titanate in amounts of up to 3% by weight, based on the binder, may be used as crosslinking catalysts.

The viscosities of 20 to 40% by weight solutions of the polyamidimides at 23° C. are in the range from 800 to 3000 mPas Polybismaleimides (component Ae)) are known and are described, for example, in DE-OS 2,131,735 and DE-PS 1,770,867. They are obtained by known methods by reacting bismaleimides with compounds containing at least two primary amino groups, in the ratio bisimide:NH$_2$=0.6 to 2.5:1.

The bismaleimides may be prepared by reacting a diprimary diamine with maleic anhydride. The following bismaleimides are preferably used: N,N'-ethylenebismaleimide, N,N'-hexamethylenebismaleimide, N,N'-m-phenylenebismaleimide, N,N'-p-phenylenebismaleimide, bis(4-maleinimidophenyl)methane, N,N'-4,4'-diphenyl ether bismaleimide, N,N'-4,4'-diphenyl sulfone bismaleimide, N,N'-4,4'-dicyclohexylmethanebismaleimide, N,N'-$\alpha,\alpha'$-4,4'-dimethylenecyclohexanebismaleimide, N,N'-m-xylylenebismaleimide, N,N',-p-xylylenebismaleimide,N,N'-4,4'-diphenylcyclohexanebismaleimide, N,N'-4,4'-(1,1-diphenylpropane)bismaleimide, N,N'-4,4'-triphenylmethanebismaleimide, N,N'-4,4'-(1,1,1-triphenylethane)-bismalermide and N,N'-3,5-1,2,4-triazolebismaleimide.

Diprimary diamines and primary triamines and tetraamines are suitable for the preparation of the polybismaleimides from an amine component and a bismaleimide. Examples of such amines have already been listed in the description of the polyamidocarboxylic acids. Oligomeric polyamines, such as those described, for example, in DE-OS 2,131,735, are also suitable.

The preparation of the polybismaleimides may be carried out in an inert polar solvent such as, for example, dimethylformamide, N-methylpyrrolidone, cresol, chlorobenzene or dimethylacetamide, or also in the absence of solvent by heating the reactants which have been previously intimately mixed together, if desired in the presence of a catalyst such as, for example, acetic acid, p-toluenesulfonic acid or maleic acid.

In a second stage the polybismaleimide is copolymerized with a monomer, since the polybismaleimide is brittle. With higher amounts of monomers, for example if more than 10% by weight of diallyl phthalate, based on polybismaleimide, are added, an organic free-radical initiator such as, for example, an organic percompound, for example t-butyl perbenzoate, must be added.

Monomers containing at least one heat-polymerizable

group are particularly suitable for the copolymerization. If these monomers contain several such groups, they must not be conjugated. The double bonds may be of the vinyl, maleic, allyl and aryl type. The monomers which may be used, may be esters, ethers, hydrocarbons, substituted heterocyclic compounds, organometallic or organometalloid compounds. Examples of such monomers are acrylates, methacrylates, vinylpyrrolidone, diallyl phthalate, triallyltriazine, triallyl isocyanurate, diallylbenzene, styrene and vinyltoluene. Those which are preferably used are styrene, vinyltoluene, vinylpyrrolidone, diallyl phthalate, triallyltriazine, triallyl isocyanurate and diallylbenzene. Diallyl phthalate is used particularly preferably.

The curing of the polybismaleimides is carried out thermally.

Suitable pigments and/or fillers (component B) are anticorrosive pigments such as, for example, strontium chromate, zinc chromate, lead chromate, zinc phosphate etc. as well as metallic pigments such as, for example, aluminum, titanium and steel flakes and the like. Examples of suitable auxiliary substances and additives are silicone oils, waxes, silicates and pyrogenic silicas.

Linear and/or cyclic aliphatic and/or aromatic hydrocarbons, ethers, esters, alcohols, amides, phenols and cresols are used as organic solvents. Aromatic hydrocarbons, N-methylpyrrolidone, N,N-dimethylformamide, N,N-dimethylacetamide, cresols and glycol ethers are preferred.

The free-radical initiators added as the component E are, for example, organic percompounds such as, for example, dibenzoyl peroxide, dicumyl peroxide, t-butyl perbenzoate and diacyl peroxides such as, for example, diacetyl peroxide. t-Butyl perbenzoate is preferably used.

The preparation of the coating materials is carried out by mixing the individual components, the binders being first dissolved in the solvent or solvent mixture. If other insoluble components, such as pigments, fillers, additives and the like are added to the coating materials, these can be added either to the solution or—if appropriate—they may be dispersed using the dispersion aggregates customary in the paint industry.

The process according to the invention comprises a one-coat or two-coat application, i.e. either only a single coat is applied or the coating consists of a primer and a topcoat, both of these being applied by the coil coating process. The binder for the primer must be unaffected by the pretreatment agent used for the coil coating strip, for example phosphoric acid. Accordingly only polyhydantoins and polyesterimides may be used as the component A for the primer binder. On the other hand, the compounds which may be used as the component A for binders for topcoats, are not subject to such constraint. However, if polyamidocarboxylic acid is used, an alcohol such as, for example, n-butanol or tertbutanol must be always added to the topcoat, in order to stabilize the viscosity of the system.

The object of the invention is particularly a process in which the primer is first applied with a dry film thickness of 4 to 15 μm, preferably 5 to 11 μm, and, when the primer has cured, the topcoat is applied with a dry film thickness of 4 to 23 μm, preferably 5 to 17 μm. In this multicoat process the coating material used as primer preferably contains anticorrosive pigments such as, for example, strontium chromate, zinc chromate, lead chromate, zinc powder and zinc phosphate. The coating material used as topcoat preferably contains metallic pigments such as, for example, aluminum, titanium and steel flakes.

The curing of the coating materials according to the invention is usually carried out at object temperatures of 200° to 350° C. and baking times from 30 to 120 seconds using any of the processes customary for coil coating.

The coated metal strip prepared by the process according to the invention is preferably used for the production of components exposed to high temperatures, such as exhaust components, exhaust air ducts, furnace and radiator claddings and grill utensils.

The coatings obtained distinguish themselves from the customary exhaust coatings in that they require a short baking time, they possess good mechanical fabrication characteristics, they are resistant to water, salt, gasoline, oil and brake fluids, they are shockproof and are resistant to exhaust combustion products, they possess good anticorrosion properties and are free from substrate and/or intercoat adhesion problems. An additional advantage is that the coating materials used have an outstandingly good shelf life.

The invention is elucidated in greater detail below by Application Examples. In these Examples, all percentages are percent by weight, all parts are parts by weight.

Preparation of the polyesterimide

The polyesterimide is prepared by the method described in DE-AS 1,445,263 from:
23.9 parts of tris(2-hydroxyethyl) isocyanurate,
14.6 parts of ethylene glycol,
20.5 parts of dimethyl terephthalate,
13.9 parts of 4,4,-diaminodiphenylmethane,
27.1 parts of trimellitic anhydride,
1.0 part of tetra-n-butyl titanate.

A 48% solution of this polyesterimide (OH value =75 to 100 mg of KOH/g) in methyldiglycol-Solvesso has a viscosity from 360 to 400 mPas.

Preparation of the polyhydantoin

The polyhydantoin is prepared by a method described in the Chemical Abstracts abstract 105(4): 25859 of the article by G. Cynkowska, J. Zakrzewski and E. Wardzinska in Polymeri (Warsawa), 30 (11–12), 449–54 (1985), from:
92.5 parts of N,N'-bis(ethoxycarbonylmethyl)-4,4'-diaminodiphenylmethane,
81.2 parts of diphenylmethane diisocyanate.

A 30% solution of this polyhydantoin in cresol has a viscosity of 1800 mPas.

Preparation of the polyamidimide

The polyamidimide is prepared by the method described in DE-AS 1,266,427 from:
38.5 parts of trimellitic anhydride,
60.0 parts of diphenylmethane diisocyanate.

A 33% solution in N-methylpyrrolidone (NMP) has a viscosity of 1500 mPas.

Preparation of the polyamidocarboxylic acid

The polyamidocarboxylic acid is prepared by the method described in GB-PS 898,651 from:
40.0 parts of 4,4'-diaminodiphenyl oxide,
43.6 parts of pyromellitic anhydride.

A 16% solution in N-methylpyrrolidone (NMP) has a viscosity of 4000 mPas.

Preparation of the polybismaleimide

The polybismaleimide is prepared by the method described in DE-OS 2,131,735 from:
72.0 parts of bis(4-maleinimidophenyl)methane,
20.0 parts of bis(4-aminophenyl)methane.

A 30% solution in NMP has a viscosity of 2200 mPas.

EXAMPLE 1

Primer 1

A primer is prepared by dispersing a mixture of 67.1 g of a 45% solution of the polyesterimide described above in methyldiglycol-Solvesso 150, 0.6 g of a transesterification catalyst (for example an organic titanate soluble in methyldiglycol-Solvesso 150), 29.7 g of zinc powder, 0.12 g of an aluminum silicate, 0.2 g of a Teflon powder, 1.9 g of tetralin and 0.3 g of a flow-out agent containing silicone. The solids content is 60.9%. The DIN 4 efflux time is 91 seconds.

EXAMPLE 2

Primer 2

A primer is prepared by dispersing a mixture of 44.4 g of a 30% solution of the polyhydantoin described above in cresol, 12.3 g of zinc powder, 0.5 g of an aluminum silicate, 0.5 g of a Teflon powder, 33.4 g of N-methylpyrrolidone, 8.3 g of Solvesso 150 and 0.6 g of a flow-out agent containing silicone. The solids content is 27.2%. The DIN 4 efflux time is 200 seconds.

EXAMPLE 3

Topcoat 1

14.3 g of aluminum powder or flakes and 14.3 g of Solvesso 150 are formed into a paste and treated with 71.4 g of the 45% polyesterimide solution described above and with 0.6 g of a transesterification catalyst (for example an organic titanate soluble in the solvent used). The resultant paint has a solids content of 46.1% and an efflux time (DIN 4) of 97 seconds.

EXAMPLE 4

Topcoat 2

7.4 g of aluminum powder or flakes are formed into a paste with 13.8 g of N-methylpyrrolidone. 55.3 g of a 16% solution of the polyamidocarboxylic acid in N-methylpyrrolidone and 8.1 g of butanol are then added and the mixture is adjusted to a solids content of 15.4% and a DIN 4 efflux time of 185 seconds using 15.4 g of N-methylpyrrolidone.

EXAMPLE 5

Topcoat 3

7.9 g of aluminum powder or flakes are formed into a paste with 5.9 g of diacetone alcohol and 5.3 g of dimethylformamide. 70.2 g of the 33% polyamidimide solution, 3.6 g of propylene carbonate, 7.0 g of Solvesso 150 and 0.2 g of a flow-out agent containing silicone are then stirred in. The solids content is 31.1%, the DIN 4 efflux time is 147 seconds.

EXAMPLE 6

Topcoat 4

4.3 g of aluminum powder or flakes are formed into a paste with 7.9 g of N-methylpyrrolidone 45.5 g of the 30% polyhydantoin solution and 15.9 g of N-methylpyrrolidone are then added. The mixture is adjusted to a solids content of 18.0% and a DIN 4 efflux time of 162 seconds using 26.4 g of a 1:1 solution of N-methylpyrrolidone:Solvesso 150.

EXAMPLE 7

Topcoat 5

53.2 g of the 30% polybismaleimide solution are added to a paste prepared from 14.2 g of aluminum powder or flakes and 14.2 g of Solvesso 150. 12.7 g of N-methylpyrrolidone and 2.1 g of propylene carbonate are worked in, followed by the addition of 3.57 g of diallyl phthalate and 0.01 g of t-butyl perbenzoate. The paint has a solids content of 33.2% at a DIN 4 efflux time of 120 seconds The testing of the coatings according to the invention is carried out in accordance with the corresponding ECCA test methods (ECCA is an abbreviation for European Coil Coating Association). The results are summarized in Tables 1–3.

TABLE 1

| Substrate | Test results Allodine 1200[1] | | | | |
|---|---|---|---|---|---|
| Primer | — | — | — | — | — |
| Baking time (sec) | 120 | 300 | 120 | 120 | 120 |
| Object temperature (°C.) | 289 | 289 | 289 | 289 | 289 |
| Film thickness (μm) (dry) | — | — | — | — | — |
| Topcoat[2] | 2 | 2 | 3 | 4 | 5 |
| Total film thickness (μm) (dry) | 8 | 10 | 8 | 11 | 13 |
| Pencil hardness | F | F | F | F | H |
| Buchholz hardness | — | — | 133 | 149 | 146 |
| Coin test[3] (substrate adhesion) | medium | good | good | good | good |
| MEK double rubbing test[4] | >100 | >100 | >100 | 90 | >100 |
| T bend/tape test[5] | 2.0/0 | 2.0/0 | 1.5/0 | 2.0/0 | 2.0/0 |
| Aging (180° C., 30 min) | 2.0/0 | 2.0/0 | 1.5/0 | 2.0/0 | 2.0/0 |
| Surface | good | good | good | good | good |

[1] Pretreated aluminum panel
[2] Baking time and object temperature same as for the primer
[3] Procedure according to ECCA test methods for testing substrate and intercoat adhesion
[4] A wad of cottonwool saturated with methyl ethyl ketone is moved across the film in uniform double rubbings until the substrate is visible. The applied force is about 20 N.
[5] Procedure according to ECCA test methods for testing adhesion and elasticity

TABLE 2

| Substrate | Test results Allodine 1200[1] | | | | | |
|---|---|---|---|---|---|---|
| Primer | 1 | 2 | 1 | 2 | 1 | 2 |

TABLE 2-continued

| Substrate | Test results Allodine 1200[1] | | | | | |
|---|---|---|---|---|---|---|
| Baking time (sec) | 120 | 120 | 120 | 120 | 120 | 120 |
| Object temperature (°C.) | 289 | 289 | 289 | 289 | 289 | 289 |
| Film thickness (μm) (dry) | 8 | 8 | 8 | 8 | 11 | 11 |
| Topcoat[2] | 2 | 2 | 3 | 3 | 4 | 4 |
| Total film thickness (μm) (dry) | 16 | 15 | 18 | 17 | 17 | 16 |
| Pencil hardness | F | F | F | F | F | F |
| Buchholz hardness | 165 | 180 | 189 | 200 | 139 | 163 |
| Coin test[3] | | | | | | |
| (substrate adhesion) | vg | vg | vg | vg | vg | vg |
| (intercoat adhesion) | vg | vg | g | g | g | g |
| MEK double rubbing test[4] | >100 | >100 | >100 | >100 | 90 | 90 |
| T bend/tape test[5] | 3.0/0 | 1.0/0 | 2.0/0 | 1.5/0 | 1.5/0 | 1.0/0 |
| Aging (180°C., 30 min) | — | 1.0/0 | — | 1.5/0 | 1.5/0 | 1.0/0 |
| Surface | good | good | good | good | good | good |

[1] Pretreated aluminum panel
[2] Baking time and object temperature same as for the primer
[3] Procedure according to ECCA test methods for testing substrate and intercoat adhesion
[4] A wad of cottonwool saturated with methyl ethyl ketone is moved across the film in uniform double rubbings until the substrate is visible. The applied force is about 20 N.
[5] Procedure according to ECCA test methods for testing adhesion and elasticity

TABLE 3

| Substrate | Test results | | |
|---|---|---|---|
| | Allodine[1] 1200 | Bonder[2] 901 | Granodine[3] C 108 |
| Primer | 2 | 2 | 2 |
| Baking time (sec) | 120 | 120 | 120 |
| Object temperature (°C.) | 289 | 277 | 277 |
| Film thickness (μm) (dry) | 9 | 9 | 9 |
| Topcoat[4] | 1 | 1 | 1 |
| Total film thickness (μm) (dry) | 28 | 26 | 26 |
| Pencil hardness | H | H | H |
| Buchholz hardness | 166 | 160 | 170 |
| Coin test[5] | | | |
| (substrate adhesion) | vg | vg | vg |
| (intercoat adhesion) | g | g | g |
| MEK double rubbing test[6] | >100 | >100 | >100 |
| T bend/tape test[7] | 1.0/0 | 1.0/0 | 3.0/0 |
| Aging (180°C., 30 min) | 1.0/0 | 1.0/0 | 3.0/0 |
| Surface | good | good | good |

[1] Pretreated aluminum panel
[2] Phosphated steel panel
[3] Chromated steel panel
[4] Baking time and object temperature same as for the primer
[5] Procedure according to ECCA test methods for testing substrate and intercoat adhesion
[6] A wad of cottonwool saturated with methyl ethyl ketone is moved across the film in uniform double rubbings until the substrate is visible. The applied force is about 20 N.
[7] Procedure according to ECCA test methods for testing adhesion and elasticity Long-term aging tests (65 h, 250° C.) indicated that no reduction of substrate adhesion and no impairment of other properties occurred in the systems described above. In addition, all systems possess a good resistance to thermal shock; for example, adhesion is unaffected by repeated heating to 250° C. and plunging into cold water. The resistance to fuels, water and salt water is outstanding.

We claim:

1. A coil coating process for coating a metal strip using a high temperature resistant system comprising applying to the metal strip a coating material comprised of:

A) a high temperature resistant system comprised of:
a) 3 to 50% by weight of a polyesterimide resin, a 20 to 60% by weight solution of which possesses a viscosity of 90 to 4000 mPas at 23° C., and the hydroxyl number of the polyesterimide is from 50 to 200 mg of KOH/g, or
b) 3 to 50% by weight of a polyhydantoin, a 20 to 40% by weight solution of which having a viscosity of 1000 to 3000 mPas at 23° C., or
c) 3 to 40% by weight of a polyamidocarboxylic acid, a 10 to 30% by weight solution of which having a viscosity of 2000 to 7000 mPas at 23° C. and in which the polyamidocarboxylic acid is in the form of an imide ring, or
d) 3 to 50% by weight of a polyamidimide, a 20 to 40% by weight solution of which having a viscosity of 800 to 3000 mPas at 23° C., or
e) 3 to 50% by weight of a polybismaleimide, a 20 to 40% by weight solution of which having a viscosity of 200 to 4000 mPas at 23° C.;

B) 3 to 40% by weight of a pigment or filler;
C) 10 to 90% by weight of an organic solvent, and
D) when polybismaleimide is included, up to 45% by weight based on the weight of the polybismaleimide, of an olefinically unsaturated monomer, the total of components A) to D) being 100% by weight.

2. The process as claimed in claim 1 wherein the polyesterimide Aa) is tris(2-hydroxyethyl)isocyanurate.

3. The process as claimed in claim 1 wherein diallyl phthalate is used as the olefinically unsaturated monomer (component D).

4. The process as claimed in claim 1 wherein t-butyl perbenzoate is used as a free-radical initiator in component D.

5. The process according to claim 1 wherein the high temperature resistant system contains 20 to 40% by weight of a polyesterimide resin Aa).

6. The process as claimed in claim 1 wherein the high temperature resistant system contains 5 to 20% of a polyamidocarboxylic acid Ac).

7. The process according to claim 1 wherein the high temperature resistant system contains 15 to 35% by weight of a polyamidimide Ad).

8. The process as claimed in claim 1 wherein the high temperature resistant system contains 8 to 35% by weight of a polybismaleimide Ae).

9. A process of claim 10 wherein the high temperature resistant system is comprised of a polyesterimide Aa) or a polyhydantoin Ab).

10. A process of claim 9 wherein the high temperature resistant system (A) is comprised of a polyesterimide a).

11. A process of claim 10 wherein the high temperature resistant system is applied to the substrate as a primer.

12. A process in accordance with claim 9 wherein the high temperature resistant system (A) is comprised of a polyhydantoin b).

13. A process in accordance with claim 12 wherein the high temperature resistant system (A) is applied as a primer.

14. A process in accordance with claim 10 further comprising applying a topcoat to the metal strip, said topcoat being comprised of a high temperature resistant system (A) containing a polyhydantoin b), a polyamidocarboxylic acid c), a polyamidimide d), or a polybismaleimide e).

15. A process of claim 12 further comprising applying a topcoat to the metal strip, said topcoat being comprised of a high temperature resistant system (A) containing a polyesterimide a), a polyhydantoin b), a polyamidocarboxylic acid c), a polyamidimide d), or a polybismaleimide e).

16. A process in accordance with claim 1 in the form of a one-coat application, wherein the high temperature resistant system (A) contains a polyhydantoin b), a polyamidocarboxylic acid c), a polyamidimide d), or a polybismaleimide e).

17. A process according to claim 1 wherein the high temperature resistant system contains 8 to 30% by weight of a polyhydantoin Ab).

18. The process as claimed in claim 14 or 15 wherein the primer is applied in a dry film thickness of 4 to 15 μm, and after curing, the topcoat is applied in a dry film thickness of 4 to 23 μm.

19. The process as claimed in claim 18, wherein the primer contains anticorrosive pigments and the topcoat contains metal pigments.

20. A process according to claim 14 or 15 wherein the primer is applied in a dry film thickness of 5 to 11 μm and the topcoat is applied in a dry film thickness of 5 to 17 μm.

21. A coating composition for use in a coil coating process comprised of:
  A) a high temperature resistant system containing at least one of a), b), c), d) and e):
    a) 3 to 50% by weight of a polyesterimide resin which in a 20 to 60% by weight solution possesses a viscosity of the range from 90 to 4000 mPas at 23° C. and the hydroxyl number of the polyesterimide is 50 to 200 mg of KOH/g; or
    b) 3 to 50% by weight of a polyhydantoin, a 20 to 40% by weight solution of which has a viscosity in the range of 1000 to 3000 mPas at 23° C.; or
    c) 3 to 40% by weight of a polyamidocarboxylic acid, a 10 to 30% by weight solution of which possesses a viscosity in the range of 2000 to 7000 mPas at 23° C. and in which the polyamidocarboxylic acid forms an imide ring by cyclization; or
    d) 3 to 50% by weight of a polyamidimide, a 20 to 40% by weight solution of which possesses a viscosity in the range of 800 to 3000 mPas at 23° C.; or
    e) 3 to 50% by weight of a polybismaleimide, a 20 to 40% by weight solution of which possesses a viscosity in the range of 200 to 4000 mPas at 23° C.;
  B) 3 to 40% by weight of a pigment or filler;
  C) 10 to 90% by weight of an organic solvent;
  D) when polybismaleimide is included up to 45% by weight, based on the weight of the polybismaleimide, or an olefinically unsaturated monomer,
the total of components A) to D) being 100% by weight.

22. The coating composition of claim 21 in the form of a primer composition containing a polyesterimide as component Aa) or a polyhydantoin as component Ab).

23. The coating composition of claim 21 in the form of a topcoat composition.

* * * * *